Sept. 18, 1934.  W. W. KEMP  1,974,392
HEATING APPARATUS
Filed May 10, 1932  2 Sheets-Sheet 1

Inventor
William Wallace Kemp
By Cushman, Bryant, Darby & Cushman
Attorneys

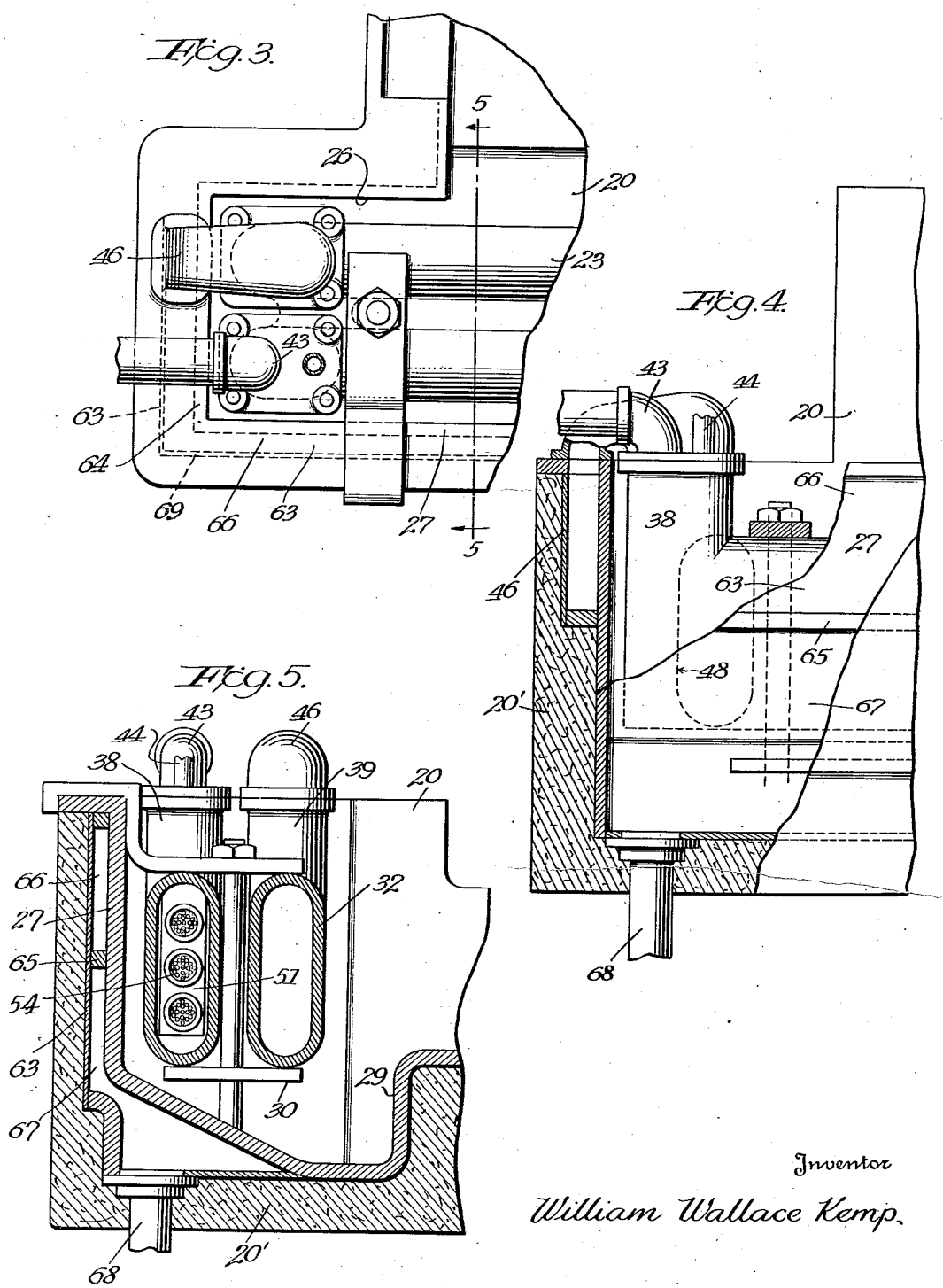

Patented Sept. 18, 1934

1,974,392

UNITED STATES PATENT OFFICE 1,974,392

HEATING APPARATUS

William Wallace Kemp, Baltimore, Md., assignor to The C. M. Kemp Manufacturing Company, Baltimore, Md., a corporation of Maryland Application May 10, 1932, Serial No. 610,492

7 Claims. (Cl. 126—343.5)

The present invention relates to an apparatus for heating materials by means of a submerged heating element. More particularly, the invention comprises an apparatus for heating metal treating baths, examples of such baths being those used for tinning, annealing, tempering and soldering metal and also salt baths. The invention is also applicable for use in pots for melting metal.

Pots such as are used for metal treating baths and pots for melting metal are usually externally heated, that is, the heat is applied to the outer walls of the pot or receptacle. In a structure of this type, the greater part of the lower exterior surface of the pot must be clear of any supporting means in order that the heating medium may come into direct contact therewith and the pot is, therefore, usually supported by a flange at its upper edge. This necessitates providing a pot with a relatively thick wall in order that it may support the load of the bath or molten metal. Because of the thickness of the pot wall, it is necessary to apply considerably more heat thereto than is actually needed to bring the contents of the pot to the desired temperature and the temperature of the contents of the pot does not sensitively respond to the temperature of the heating medium. By the external method of heating, the temperature of the furnace chamber surrounding the pot is necessarily greatly above that of the contents of the pot and the flue gases carry off a large amount of waste heat.

My invention contemplates the heating of metal treating pots and melting pots by means of a heating element which is submerged in the contents of the pot. The submergence of the heating element in the pot permits the use of a pot having a wall of relatively small cross section, since the entire lower surface of the pot may be supported directly in a bed or casing of insulating material, thereby greatly reducing the cost of installation. Also, since the heating medium is applied directly to the material itself, rather than to the wall of the container, there is a tremendous saving in fuel, and at the same time the temperature of the bath is highly responsive to changes in the temperature of the heating medium and may be very accurately regulated by control of the heating medium. Inasmuch as the heating element serves the purpose of a heat transferring medium only, the cross section of its wall is but a fraction of that of the usual pot wall and this factor enables rapid heat transfer so that the maximum heating value may be derived from the heating medium.

With the external method of heating bath pots or metal melting pots, the heating medium applied to the pot must be very carefully regulated and kept low at the start of the heating operation, because the sudden application of a high temperature to the pot will cause the metal in the lower part of the pot to become molten and expand, while the metal in the upper portion of the pot yet remains solid. This causes a stress upon the walls of the pot with the probable result that the pot will be broken. With my structure, if a vent extending to the surface of the metal is used, or if an auxiliary heating chamber adjacent a wall of the pot and connected to the vent of the heating element is provided, a high temperature may be applied to the cold, solid metal in the pot at the outset of the heating operation due to the fact that the vent or chamber will be heated by the passage of the heating medium therethrough, thereby causing the metal about the vent or adjacent the auxiliary chamber, as well as immediately adjacent the heating element, to be melted. The presence of the molten metal about the vent pipe, or adjacent the wall near the auxiliary chamber, and extending up to the surface of the metal in the pot, permits all expansion to be accommodated at this point until the remainder of the metal has become molten. Therefore, with my structure, considerable time is saved in bringing the pot to a working temperature.

Another advantage resulting from the use of a submerged heating element is that the pot need not be operated at its full capacity, since the supply of heating medium may be directly adjusted to the feed of the materials passed through the pot. In external heating practice, when the pot is not filled to capacity, air currents filtering into the combustion chamber and pot extract heat from both the pot and its supporting structure. By spacing the heating elements through the entire contents of the pot and by providing the heating elements with an adequate amount of surface, it is never necessary to carry a high temperature differential between the heating elements and the contents of the pot. In other words, the heat need only be supplied as rapidly as the material being heated can absorb it and dross formation from this common source is thus greatly minimized.

An important advantage of my structure is the speed with which the pot can be brought into service. Since there is no barrier to heat flow—nothing to absorb heat save the material to be heated—large units can be brought into service in a relatively short time.

Heating units constructed in accordance with my invention are preferably equipped with heating burners or heating means which are readily removable from the heating unit and the heating elements themselves are removable from the pot in which they are positioned. It is obvious from this that the heating of a particular pot may be varied over a wide range without affecting the fixed installation. I preferably confine the flame or other heating medium entirely within the heating element and exposed flames are thereby eliminated. The heating medium used in my apparatus is preferably a mixture of air and gas or oil combined in such proportions that the mixture is flame sustaining; that is, sufficient oxygen is present in the mixture to completely burn the fuel mixed therewith and no secondary air is required. My heating element is preferably of such construction that the products of combustion passing therethrough have a continuous circulatory movement.

In the drawings:—

Figure 3 is a fragmentary plan view;

Figure 4 is a side elevation, parts of the structure being broken away;

Figure 5 is a vertical section taken on the line 5—5 of Figure 3.

Figure 1:
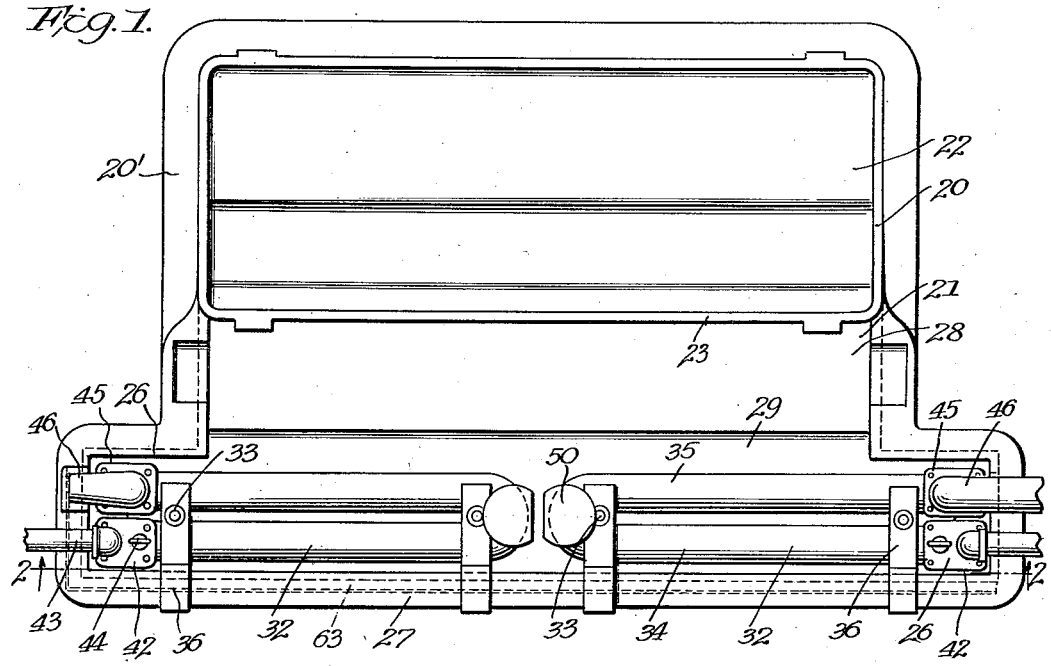
Figure 1 is a plan elevation of a pot, for tinning steel sheets, provided with the heater of my invention.
Figure 2:
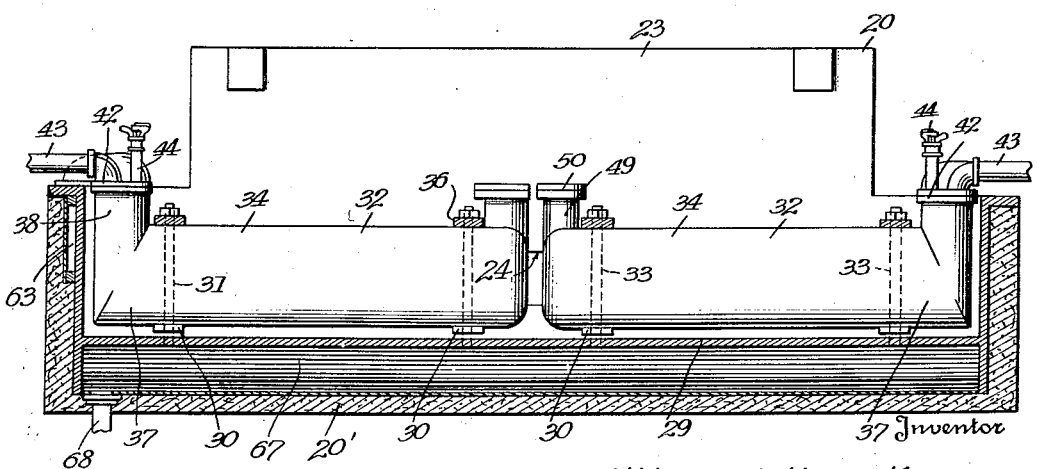
Figure 2 is a vertical section taken on the line 2—2 of Figure 1.

Referring to Figures 1 to 4 inclusive, the numeral 20 designates a pot for tinning steel sheets or making what is known as tinplate and which is supported in a bed of insulating material 20' and divided into two compartments 21 and 22, which compartments are separated by an upwardly extending partial partition wall 23. A horizontally elongated aperture 24 is provided in the lower portion of the wall 23 so that the two compartments communicate. The compartments 21 and 22 are normally filled with the molten tin, the surface of the tin being adjacent the upper edge of the compartment 21. The compartment 22 contains a stratum of oil 25 above the level of the molten metal therein in accordance with the usual practice. Compartment 21 includes lengthened or offset end portions or chambers 26 adjacent its side wall 27, and the bottom wall 28 of the compartment 21 includes a depressed portion 29 between the end walls of the end chambers 26. Spaced platforms or supports 30 are provided in the depressed portion 29, the platforms 30 being mounted upon posts 31. Elongated endless heating units 32 formed of a suitable alloy or material to properly conduct the heat and capable of withstanding the temperatures to be employed are supported on the platform 30, two such heating units being normally provided, end to end, as shown. The heating units are secured to the platforms 30 by means of posts 33 extending upwardly from the platform 30 between the runs 34 and 35 of each of the units. The upper ends of the posts 33 are threaded to receive nuts which secure clamps 36 down against the upper surfaces of the runs of the heating elements, the clamps 36 being provided with anchor end portions which extend over the upper edge of the side wall 27 of the compartment 21.

Each of the heating units 32 is provided at its outer end 37 within the end chambers 26 of the pot 20 with upwardly projecting extensions 38 and 39 which are respectively provided with inlet and vent apertures. The inlet aperture is provided with an inlet plate 42 which may be secured to the extension 38 by means of screws or the like. A fuel feeding pipe 43 is threaded into the inlet plate 42 to supply any suitable fuel, although it is preferably connected to a gas and air mixing apparatus wherein air and gas are mixed in such proportions that the mixture is flame sustaining; that is, sufficient oxygen is in the mixture to completely burn the gas mixed therewith and no additional supporter of combustion is required. The inlet plate 42 is also provided with a lighter port 44 which may normally be closed by any suitable means. A vent plate 45 is fitted upon the vent aperture and a vent pipe 46 is connected to this plate.

As has been stated, each of the heating elements 32 is endless and is substantially of the form of an open rectangle of considerably greater length than breadth, the runs 34 and 35 comprising the longer sides. The outer ends of the runs are joined by a passage and their inner ends, that is, their ends adjacent the apertures 38 and 39 communicate through a passage 48. Each of the runs is relatively narrow in horizontal cross section but has a substantial depth, as is best shown in Figure 5, so that the entire heating element will occupy a minimum of space in a horizontal plane, but will provide a maximum heating surface. The end passages conform to the cross section of the runs 34 and 35. As will be understood from Figures 2 and 3 of the drawings, the entire area of the runs is submerged in the mass in the pot 20 and since the heating elements are positioned closely adjacent the infeed side 27 of the pot 20, they will not form an obstacle to the feeding of steel sheets or other material into the pot. I find that the sheets passing through the bath cause the heat of the heating elements 32 to be transmitted entirely through the bath. Casting of the heating element 32 is facilitated by providing an apertured extension 49 in the upper surface of the outer end passage. This is subsequently closed by a plate 50.

Because of the vertical depth of the runs of the heating element 32, it is desirable to provide a burner 51 which is fitted with a plurality of vertically spaced burner heads or jets 54, as is best shown in Figure 5, so that the flames issuing from the burner 51 will substantially fill the inner area of the runs. The burner 51 illustrated comprises a pipe depending through the extension 38 from the inlet plate 42, where it is connected to the fuel feed pipe 43, as shown in Figure 5. Each of the vertically spaced burner nozzles comprises a jet portion 54 provided with an apertured wall, the flames issuing through these jets into the run 34. The jets 54 are fixed to the burner pipe by any suitable means. The products of combustion resulting from the flame at the nozzles will, because of the pressure of the fuel, move along the run 34 of the heating element at high velocity and will return through the run 35. The greater part of the products of combustion will pass from the run 35 back to the run 34 through the passage 48, resulting in a circular course of travel on the part of the products of combustion. In passing the nozzles, the products of combustion will be re-heated by the flames issuing from the nozzles.

In the use of the tinning pot of this construction, the metal to be tinned will be fed into the pot over the side wall 27 by feed rollers or the like from the usual fluxing bath, not shown. The sheets will be passed above the runs of the heating element and beneath the level of the molten metal in the compartment 21. The sheets of metal will then be passed through the aperture 24 in the partition wall 23 and upwardly in the compartment 22, from which they will be removed in the usual manner.

By the use of my system of heating heat treating baths, a very large portion of the weight of such installations is eliminated and the pots used in the installations have a considerably lower cost because of the fact that it is unnecessary to provide a pot having a wall of the thickness of the wall of the pot which must be used when an external system of heating is employed. Inasmuch as the externally fired pot must act as a supporting container for the bath, its wall thickness is sometimes as much as twenty times that of the walls of the pot of a unit. The pot used with the unit being supported in the insulating seating 20', the weight of the material in the pot is supported throughout by this seating rather than by a flange or rim or piers.

Figures 3, 4 and 5 show in detail the structure whereby the products of combustion issuing from the vent 46 are led through a chamber 63 including a passage provided along the end wall 64 and side wall 27 of the pot 20 so as to give an increased heating action. The chamber 63 is preferably divided by a horizontally extending partition wall 65 with the result that the chamber is divided into upper and lower passages 66 and 67, respectively, as shown. The gases enter the upper passage from the vent pipe 46 and flow along the upper portion of the pot wall 27 and then pass downwardly in contact with the lower portion of this wall. The lower passage 67 extends down about the lower side of the pot as shown in Figure 5. The products of combustion emerging from the lower passage 67 are passed through a vent conduit 68.

When my heating elements are installed in deep metal melting pots with the body of the heating element at a substantial distance beneath the level of the metal in the pot and with the burner within or opposite the deeply positioned heating element instead of near the surface of the metal in the pot, the heat from the vented gases passing from the burner to the surface of the metal is not sufficient to melt the metal about the vent and thereby provide an escape to the surface for the metal melting about the heating element. Unless the surface is melted through, the melting and expanding metal around the element creates an internal pressure which soon becomes sufficient to break through the surface crust of unmelted metal. The melted metal then breaks through the crust with force. The provision of the chamber 63 having one wall thereof formed by a wall of the container or pot 20, as at 27, and preferably extending to a point adjacent the upper edge of the container 20, insures that when the metal in the pot or container is cold and heat first applied, a vent will be provided from the lower portion of the metal in the pot to its upper surface. In other words, when the pot is cold and heat is applied to the heating element 32, the products of combustion passing through the element will heat the metal in the pot adjacent the element and the passage of these products of combustion through the chamber 63 will also cause the metal in the pot adjacent the wall 27 to be heated, melting this metal and thereby insuring that an adequate path of expansion for the melting metal will be provided and the possibilities of damage to the pot eliminated.

The construction of the heating element, its arrangement with respect to the container or pot (other than as claimed in the present case) and the method of heating performed by the heating element is claimed in my divisional application Serial No. 741,187, filed August 23, 1934.

I claim:

1. In a heating apparatus for a mass having the characteristic of being solid at normal temperature and fluent at higher temperatures, a container for the mass, a tubular heating element positioned in said container to be submerged in the mass, said heating element being provided with an inlet, a burner at said inlet to project ignitable fluid fuel into said heating element and to cause the products of combustion to move through the latter, said heating element being provided with a vent, a chamber having one wall thereof formed by a wall of said container and connected to the vent of said heating element whereby products of combustion issuing from said vent will move through said chamber to heat the portion of the mass adjacent said wall simultaneously with the heating of the mass at the central portion of said container by said heating element.

2. In a heating apparatus for a mass having the characteristic of being solid at normal temperature and fluent at higher temperatures, a container for the mass, a tubular heating element positioned in said container to be submerged in the mass, said heating element being provided with an inlet, a burner at said inlet to project ignitable fluid fuel into said heating element and to cause the products of combustion to move through the latter, said heating element being provided with a vent, a chamber having one wall thereof formed by a wall of said container and connected to the vent of said heating element whereby products of combustion issuing from said vent will move through said chamber to heat the portion of the mass adjacent said wall simultaneously with the heating of the mass at the central portion of said container by said heating element, said chamber having a baffle plate so arranged as to cause the products of combustion to follow a circuitous course therein.

3. In a heating apparatus for a mass having the characteristic of being solid at normal temperature and fluent at higher temperatures, a container for the mass, a tubular heating element positioned in said container to be submerged in the mass, said heating element being provided with an inlet, a burner at said inlet to project ignitable fluid fuel into said heating element and to cause the products of combustion to move through the latter, said heating element being provided with a vent, a chamber having one wall thereof formed by a wall of said container and connected to the vent of said heating element whereby products of combustion issuing from said vent will move through said chamber, said chamber extending adjacent the upper portion of said container to permit the adjacent portion of the mass to be heated simultaneously with the heating of the mass at the central portion of said container by said heating element.

4. In a heating apparatus for a mass having the characteristic of being solid at normal temperature and fluent at higher temperatures, a container for the mass, an insulating supporting structure for said container, a tubular heating element positioned in the container to be submerged in the mass, said heating element being provided with an inlet, a burner at said inlet to project ignitable fluid fuel into said heating element and to cause the products of combustion of the fuel to move through the latter, said heating element being provided with a vent, a chamber provided within said supporting structure and having one wall thereof formed by a wall of said container, the vent of said heating element being connected to said chamber whereby products of combustion issuing from said vent will move through said chamber to heat the portion of the mass adjacent said wall simultaneously with the heating of the mass at the central portion of said container by said heating element.

5. In a heating apparatus for a mass having the characteristic of being solid at normal temperature and fluent at higher temperatures, a container for the mass, a heating element positioned in said container to be submerged in the mass, said heating element being provided with an inlet and a vent, a burner at said inlet to project ignitable fluid fuel into said heating element and to cause the products of combustion of the fuel to move through the latter, said heating element being tubular in cross section and having a return bend therein to provide two substantially parallel legs, said inlet and burner being positioned at the end of one of said legs remote from the return bend and said vent being positioned at the corresponding end of the other leg to cause the products of combustion to follow a return course in said heating element and to apply heat over a wide area of the contents of said container, a chamber having one wall thereof formed by a wall of said container and connected to the vent of said heating element whereby products of combustion issuing from said vent will move through said chamber to heat the portion of the mass adjacent said wall simultaneously with the heating of the mass at the central portion of said container by said heating element.

6. In a heating apparatus for a mass having the characteristic of being solid at normal temperature and fluent at higher temperatures, a container for the mass, a tubular heating element positioned in said container to be submerged in the mass, said heating element being provided with an inlet connection, a burner for said heating element connected to said inlet connection and positioned to be beneath the surface of the mass to project ignitable fluid fuel into said heating element and to cause the products of combustion to move through the latter, said heating element being provided with a vent connection, said inlet and vent connections being disposed to extend above the surface of the mass, a chamber having one wall thereof formed by a wall of said container and connected to the vent connection of said heating element whereby products of combustion issuing from said vent connection will move through said chamber to heat the portion of the mass adjacent said wall simultaneously with the heating of the mass at the central portion of said container by said heating element.

7. In a heating apparatus for a mass having the characteristic of being solid at normal temperature and fluent at higher temperatures, a container for the mass, a heating element positioned in said container to be submerged in the mass, said heating element being provided with an inlet connection and a vent connection, a burner connected to said inlet connection and positioned to be beneath the surface of the mass to project ignitable fluid fuel into said heating element and to cause the products of combustion to move through the latter, said heating element being tubular in cross section and having a return bend therein to provide two substantially parallel legs, said inlet connection and burner being positioned at the end of one of said legs remote from the return bend and said vent connection being positioned at the corresponding end of the other leg to cause the products of combustion to follow a return course in said heating element and to apply heat over a wide area of the contents of said container, said inlet and vent connections being disposed to extend above the surface of the mass, a chamber having one wall thereof formed by a wall of said container and connected to the vent connection of said heating element whereby products of combustion issuing from said vent connection will move through said chamber to heat the portion of the mass adjacent said wall simultaneously with the heating of the mass in the central portion of said container by said heating element.

WILLIAM WALLACE KEMP.